United States Patent Office 2,838,107
Patented June 10, 1958

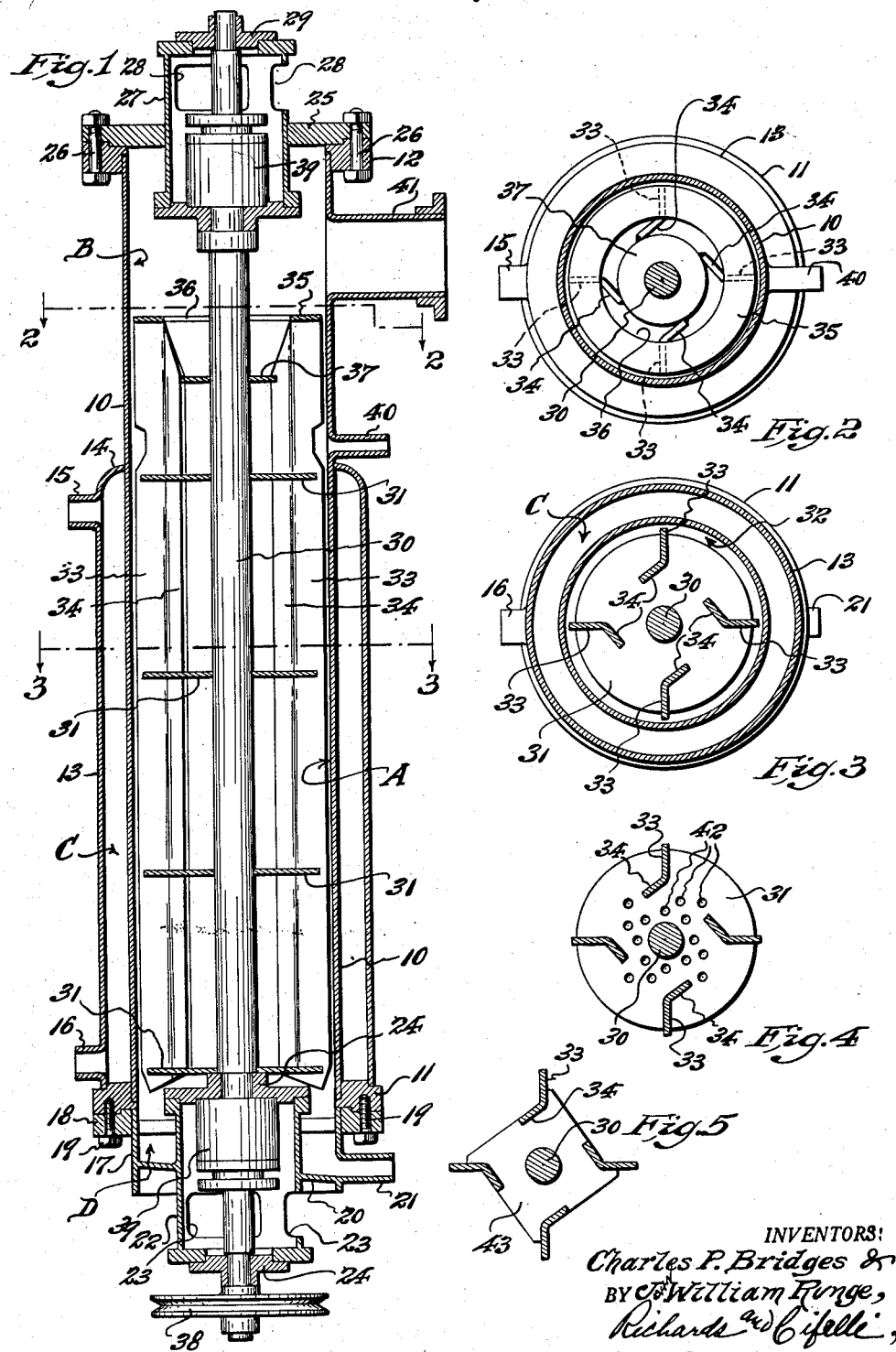

2,838,107

APPARATUS FOR EVAPORATING AND CONCENTRATING LIQUIDS

Charles P. Bridges, Morristown, and John William Runge, Ridgefield, N. J., assignors to Charles P. Bridges, doing business as Bridges Engineering Company, Morristown, N. J.

Application July 12, 1956, Serial No. 597,449

4 Claims. (Cl. 159—6)

This invention relates to improved apparatus for evaporating and concentrating liquids containing organic substances; and the invention has reference, more particularly, to that type of such apparatus wherein the liquid to be treated is passed in the condition of a thin film, which is caused to descend along a suitably heated wall with evaporating and concentrating effect, the liberated vapor being discharged from the upper end of the apparatus and the concentrate from the lower end thereof.

One of the problems involved in the use and operation of such apparatus is the loss due to entrainment of liquid droplets in the discharging vapor. Heretofore attempts have been made to separate entrained liquid from the vapor, but the means provided for so doing have not been found to be altogether satisfactory or efficient. For example, it has been attempted to induce such separation by causing the vapor, after it leaves the evaporator section of the apparatus, to impinge upon stationary baffles, whereby to deposit and collect its entrained liquid particles upon said baffles and by gravitation therefrom back to the evaporator section. Due however to excessive vapor turbulence in the baffling region, deposit of liquid droplets upon the stationary baffles is so interfered with that a considerable percentage of said liquid droplets remain entrained in the discharging vapor, so as to escape with the latter with consequent loss.

Having the above in view, it is an object of this invention to provide a liquid evaporating and concentrating apparatus having highly efficient means for separating entrained liquid droplets from the vapor, said means eliminating all stationary baffles, both vertical and horizontal, and to this end to provide the apparatus with a rotor of novel construction which includes means for detraining liquid particles from the produced vapor by centrifugal force, not only in the zone of vapor discharge, but also within the evaporator section or chamber itself.

Another object of this invention is to provide, in a liquid evaporating and concentrating apparatus, a novel construction of rotor having blades of angular cross-sectional shape which not only enhance the strength and rigidity of the rotor, but also more effectively whirl and direct the liquid to be treated for film forming deposit on the walls of the evaporator section or chamber of the apparatus.

The above and other objects will become apparent from a reading of the following description of an illustrative embodiment of this invention in connection with the accompanying drawings thereof, in which:

Fig. 1 is a central vertical longitudinal sectional view of a liquid evaporating and concentrating apparatus according to this invention; Fig. 2 is a horizontal sectional view therethrough, taken on line 2—2 in Fig. 1; and Fig. 3 is another horizontal sectional view therethrough, taken on line 3—3 in Fig. 1.

Fig. 4 is a horizontal sectional view showing a modified form of the rotor of the apparatus; and Fig. 5 is a similar view showing another modified form of the rotor.

Referring to the drawings, in which like characters of reference indicate corresponding parts, the reference character 10 indicates a tubular, generally cylindrical, upstanding column, the lower interior portion of which provides the evaporating section A of the apparatus, which is formed by a major portion of the length of said column, and the upper interior portion of which provides the vapor discharge section B thereof, which is formed by a minor portion of the length of the column.

At its lower end, the column 10 is provided with an external annular bottom flange 11, and at its upper end with a similar external annular top flange 12. Surrounding the evaporating section A of the column 10, in outwardly spaced and concentric relation thereto, so as to provide an intervening heating medium chamber C, is an external jacket shell 13. The upper end of said jacket shell is closed by a top wall 14, which is attached to the wall of the column 10, as by welding the same thereto. The lower end of the jacket shell is attached to and closed by the bottom flange 11 of the column. Steam or other heating medium is introduced into the upper end of the chamber C through an intake connection 15, and is discharged from the lower end of said chamber C through an outlet connection 16, so that circulation of the steam or other heating medium through the chamber C is maintained, whereby to heat the walls of the column 10, which bound the evaporating section A thereof, to a suitable degree, all as well known to the art.

Communicating with the bottom end of the evaporating section A is a concentrate discharge member 17 which is provided at its upper end with an external annular flange 18, the latter being secured to the bottom flange 11 of the column 10 by fastening bolts 19, thus coupling said discharge member in assembled relation to said column. The bottom of said discharge member 17 is closed by a bottom wall 20. The interior of the discharge member provides a concentrate collection sump D, from which concentrate is discharged through an outlet connection 21.

Unitary with the discharge member 17 is an axially disposed hollow housing member 22, which extends upwardly through the bottom wall 20 of the former into the lower end of the column 10. The lower external part of said housing member 22 is provided with openings 23 giving access to the interior thereof. Said housing member terminates at its respective upper and lower ends in shaft bearings 24.

The upper end of the column 10 is closed by a cap plate 25 which is secured to the top flange 12 of said column by fastening bolts 26. Unitary with said cap plate is an axially disposed hollow housing member 27, which extends downwardly therethrough into the upper end of said column 10. The upper external part of this housing member 27 is provided with openings 28 giving access to the interior thereof. This housing member 27 also terminates at its respective upper and lower ends in shaft bearings 29.

A rotor is mounted co-axially within the column 10 to extend upwardly through the evaporating section A and into the lower portion of the vapor discharge section B. Said rotor comprises an actuating shaft 30, the lower end portion of which is journaled in the bottom shaft bearings 24. Affixed to the rotor shaft 30, at suitably spaced intervals therealong, as by welding the same thereto, are a plurality of transversely disposed, horizontal centrifuge plates 31. In a preferred form thereof, said centrifuge plates are of circular peripheral shape, and are of diameter appreciably less than the internal diameter of the column 10, so that vapor passage space 32 (see Fig. 3) is provided between their peripheries and the walls of the column 10. The vanes of the rotor extend longitudinally thereof in close proximity to the internal wall surface of the column 10, and so as to leave small clearance between their outer edges and the latter, whereby intervening space is provided which will accommodate the deposit of a film of liquid to be treated upon the column wall portions which bound the evaporating section A, subject to down flow over the wall surface. The inner edges of the vanes are spaced outwardly from the shaft 30, whereby to provide passage space to permit circulation and upward flow of vapor around and between the vanes and the shaft. Said rotor vanes comprise blades of angular shape in cross-section. Each blade consists in an outer section 33 radial to the shaft 30, and an inner angular section 34, which projects at an obtuse angle relative to the outer section, and disposed to extend in the direction of rotation of the rotor, which is in counterclockwise direction. A selected number of the vanes or blades are equally spaced apart around the rotor; preferably at least four thereof are provided, although it will be understood that more or less than such number can be provided if desired. The vanes or blades intersect the outer marginal portions of the centrifuge plates 31, and are suitably affixed thereto so as to be carried thereby, preferably by welding the same to said plates. The outer longitudinal marginal edge portions of the outer sections 33 of the vanes or blades project beyond the peripheries of the centrifuge plates 31 to their desired clearance space relation to the walls of the column 10. Affixed to the top ends of the outer sections 33 of the rotor vanes or blades, so as to bridge the same, and so as to be rotated by the rotor, is an annular partition plate 35, which defines a central opening 36 through which vapor can pass into the vapor discharge section B. Spaced downwardly from said partition plate 35, in transverse or horizontal disposition between the extremities of the inner angular sections 34 of the vanes or blades and the rotor shaft 30, is an inner partition plate 37 adapted to rotate with the rotor. The space between the central opening 36 of the annular partition plate 35 and said inner partition plate 37 affords a vapor escape path with which the spaces between the rotor vanes or blades communicate, through which vapor from the evaporating section A passes into the vapor discharge section B.

The rotor is adapted to be driven from any suitable power source (not shown), as e. g. by a drive pulley 38 which is affixed to the shaft 30, and to which power from the power source can be transmitted by suitable transmission means (not shown).

Supported by and within the respective housing members 22 and 27, around the rotor shaft 30, are shaft seal structures 39. These shaft seal structures may be of any selected type adapted to seal the shaft against influx of air therealong into the column 10 with vacuum breaking effect, when the apparatus is operated under vacuum conditions, as well as to prevent oil leakage along the shaft into the interior of the apparatus.

Above the jacketed evaporating section A of the column 10, and between said section and the vapor discharge section B, the column 10 is provided with an inlet connection 40, through which liquid to be treated can be introduced into said evaporating section A, and in opposition to the upper portion of the rotor of the apparatus.

Leading outwardly from the upper portion of the vapor discharge section B of the column 10 is a vapor outlet connection 41, which may also serve as a vacuum line.

In operation of the apparatus of this invention, the rotor being put in motion, and steam or other heating medium being circulated through the chamber C, to elevate the temperature of the wall of the evaporating section A of the column 10 to a selected degree, liquid to be treated is introduced through the intake connection 40 into the upper end of said evaporating section A. The introduced liquid, by the centrifugal effect of the rotating vanes or blades of the rotor, is caused to form a liquid film upon the heated walls of the evaporating section A, for down flow thereon. The evaporating effect of heat transferred to the liquid film, vaporizes the volatile constituents of the liquid film, thus producing the desired concentrate which gravitates to the collection sump D for discharge through the outlet connection 21 thereof.

The vapor liberated from the liquid film within the evaporating section A enters the interior of the rotor, and, in upward movement through the latter, encounters the whirling centrifuge plates 31. Droplets of liquid, which may be entrained in the vapor, impinge against and collect upon the surfaces of said centrifuge plates, being thereupon subjected to centrifugal force induced by the whirling motion of the latter, with the result that said droplets are separated or detrained from the vapor, and thereupon thrown back into the down flowing liquid film on the wall of the column 10. The vapor, after encountering one centrifuge plate, flows upwardly around the periphery thereof through the vapor passage 32 intermediate said periphery and the column wall, and then back into the rotor interior for contact with a succeeding centrifuge plate. Such liquid detrainment effect upon the vapor continues as the vapor progresses upwardly through the rotor, and finally reaches the upper end of the latter for delivery therefrom into the vapor discharge section B. At the upper end of the rotor, the vapor is deflected by the inner partition plate 37 so as to encounter the rotating partition plate 35. Substantially all remaining liquid droplets entrained in the vapor are caught by said partition plate 35, and, by the centrifugal effect of the latter, are thrown onto the column wall for down flow therealong to rejoin the liquid film within the evaporating section A.

From the above it will now be understood that the vapor is constantly subjected to liquid detrainment effect throughout its upward progress through the rotor and into the vapor discharge section B, with the consequence that by the time it gathers in said discharge section B, for discharge therefrom, it is substantially free from entrained liquid particles or droplets, so that losses, due to escape of liquid with the discharged vapor, are reduced to a minimum.

It will be apparent that in the apparatus of this invention all stationary baffles, either of vertical or horizontal disposition, are eliminated, and undue vapor turbulence inducing effect thereof is therefore avoided.

It may be here pointed out that the provision of rotor vanes or blades of angular cross-section, and in outwardly spaced relation to the rotor shaft 30, so as to provide space for vapor movement within the rotor interior, is of considerable advantage. Vanes or blades of such angular formation not only assure a rotor structure of great strength and rigidity, but the angular inner sections 34 thereof function to more positively deflect free liquid toward the walls of the evaporating section A, while the radial outer sections 33 thereof apply centrifugal force to the liquid film on the heated wall of the evaporating section A, so as to maintain the liquid film in constant motion and downflow along said wall, whereby risk of overheating of the treated liquid is avoided.

Although rotor centrifuge plates 31 of imperforate form, as shown in Figs. 1 and 3, are found to be satisfactory, and perhaps preferable, if desired, the central portions of said centrifuge plates may be provided with suitably grouped perforations 42 (see Fig. 4), whereby to furnish additional passage means for upward flow of vapor through the rotor. Furthermore, although rotor centrifuge plates of circular peripheral form are believed to be most desirable, such plates may be of other peripheral contour, such e. g. as shown in Fig. 5, wherein the same comprise a plate 43 of spider-like or angular peripheral design, to the ends or corners of which the rotor vanes or blades are affixed. Centrifuge plates of the latter form will effect centrifugal detrainment influence upon liquid droplets entrained in the vapor, while allowing more vapor passage space around the peripheries thereof.

Since variation in form and structural detail of the apparatus of our invention can be made without departing from the scope of our invention as defined by the herefollowing claims, it is to be understood that all matter hereinabove set forth, or shown in the accompanying drawings, is to be interpreted as illustrative and not in a limiting sense.

We claim:

1. Liquid concentrating apparatus comprising a cylindrical column the lower portion of which provides an evaporating section having means to discharge concentrate therefrom and the upper portion of which provides a vapor discharge section, means to heat the wall of the evaporating section, and a rotor mounted co-axially within the column for extension through the evaporating section to the vapor discharge section, said rotor comprising an axial shaft having transverse centrifuge plates longitudinally spaced therealong and affixed thereto whereby to rotate therewith, longitudinally extending vanes carried by outer marginal portions of said centrifuge plates in outwardly spaced relation to and around the shaft, outer edges of said vanes and centrifuge plates terminating in close proximity to the column wall, an annular partition plate affixed to and bridging the upper ends of said vanes, a second partition plate extending between the rotor shaft and inner margins of said blades and spaced below said annular partition plate whereby to provide the upper end of the rotor with a vapor outlet communicating with the vapor discharge section, said partition plates being adapted to supplement the centrifugal effect of the centrifuge plates, and means to introduce liquid to be concentrated for down flow along the heated wall of the evaporator section.

2. Liquid concentrating apparatus according to claim 1 wherein the rotor vanes are of angular cross-sectional shape, each comprising a radial outer section and an inner section angular to said outer section.

3. Liquid concentrating apparatus comprising a cylindrical column the lower portion of which provides an evaporating section having means to discharge concentrate therefrom and the upper portion of which provides a vapor discharge section, means to heat the wall of the evaporating section, and a rotor mounted co-axially within the column for extension through the evaporating section to the vapor discharge section, said rotor comprising an axial shaft, transverse circular centrifuge plates longitudinally spaced along said shaft and affixed thereto whereby to rotate therewith, the peripheries of said centrifuge plates being spaced away from the column wall, said centrifuge plates defining a series of successive vapor chambers through which vapor is caused to travel in a substantially zig-zag path upwardly from one chamber to another around the peripheries of said centrifuge plates, longitudinally extending impeller blades intersecting the outer marginal portions of said centrifuge plates and affixed thereto so as to rotate therewith, said blades being disposed around said shaft in outwardly spaced relation thereto, outer edges of said blades terminating in close proximity to the column wall, and an annular partition plate affixed to and bridging the upper ends of said blades, a second partition plate extending between the rotor shaft and inner margins of said blades and spaced below said annular partition plate whereby to provide the upper end of the rotor with a vapor outlet communicating with the vapor discharge section, said partition plates being adapted to supplement the centrifugal effect of the centrifuge plates, and means to introduce liquid to be concentrated for down flow along the heated wall of the evaporator section.

4. Liquid concentrating apparatus according to claim 3 wherein the rotor blades are of angular cross-sectional shape, each comprising a radial outer section and an inner section angular to said outer section.

References Cited in the file of this patent

UNITED STATES PATENTS

| 1,240,386 | Swengel | Sept. 18, 1917 |
| 1,403,804 | Merrell | Jan. 17, 1922 |
| 1,406,055 | Merrell | Feb. 7, 1922 |
| 1,701,777 | Jensen | Feb. 12, 1929 |
| 1,958,666 | Honigmann | May 15, 1934 |
| 2,218,342 | Pegram | Oct. 15, 1940 |
| 2,546,380 | Zahn | Mar. 27, 1951 |
| 2,774,415 | Belcher | Dec. 18, 1956 |

FOREIGN PATENTS

| 5,438 | Great Britain | A. D. 1909 |